(12) United States Patent
Tsutsu

(10) Patent No.: US 11,473,543 B2
(45) Date of Patent: Oct. 18, 2022

(54) CONTROL DEVICE

(71) Applicant: DENSO CORPORATION, Kariya (JP)

(72) Inventor: Yuuki Tsutsu, Kariya (JP)

(73) Assignee: DENSO CORPORATION, Kariya (JP)

(*) Notice: Subject to any disclaimer, the term of this patent is extended or adjusted under 35 U.S.C. 154(b) by 441 days.

(21) Appl. No.: 16/589,221

(22) Filed: Oct. 1, 2019

(65) Prior Publication Data

US 2020/0102927 A1    Apr. 2, 2020

(30) Foreign Application Priority Data

Oct. 1, 2018  (JP) .............................. JP2018-186935

(51) Int. Cl.
| | |
|---|---|
| *F02N 11/08* | (2006.01) |
| *B60R 16/02* | (2006.01) |
| *F02D 45/00* | (2006.01) |
| *F02D 29/00* | (2006.01) |
| *B60W 10/18* | (2012.01) |

(52) U.S. Cl.
CPC .......... *F02N 11/0814* (2013.01); *B60R 16/02* (2013.01); *B60W 10/18* (2013.01); *F02D 29/00* (2013.01); *F02D 45/00* (2013.01); *B60W 2510/18* (2013.01); *F02N 2200/0802* (2013.01); *F02N 2200/0806* (2013.01); *F16H 2312/14* (2013.01)

(58) Field of Classification Search
CPC ......... F02N 11/0814; F02N 2200/0802; F02N 2200/0806; F02N 2200/0808; F02N 11/0829; B60R 16/02; B60R 16/023; B60W 10/18; B60W 2510/18; F02D 29/00; F02D 45/00; F02D 29/02; F02D 41/08; F02D 41/042; F02D 41/2438; F02D 41/2451; F02D 41/28; F16H 2312/14; Y02T 10/40
See application file for complete search history.

(56) References Cited

U.S. PATENT DOCUMENTS

| | | | |
|---|---|---|---|
| 6,532,926 B1 * | 3/2003 | Kuroda ................... | B60K 6/46 903/917 |
| 10,081,361 B2 * | 9/2018 | Books ..................... | B60R 16/03 |
| 10,773,720 B2 * | 9/2020 | Books ................. | B60R 16/0236 |
| 2014/0379200 A1 * | 12/2014 | Yagi ..................... | G07C 5/0808 701/29.4 |
| 2019/0023272 A1 * | 1/2019 | Books ............. | B60W 30/18018 |

FOREIGN PATENT DOCUMENTS

| | | |
|---|---|---|
| JP | 2005-238950 A | 9/2005 |
| JP | 5136836 B2 | 2/2013 |
| JP | 2016-220443 A | 12/2016 |

* cited by examiner

*Primary Examiner* — Joseph J Dallo
(74) *Attorney, Agent, or Firm* — Oliff PLC

(57) ABSTRACT

A control device obtains a specification of a vehicle-mounted device which is mounted on a vehicle, and implements a control according to the specification. The vehicle-mounted device includes a transmission unit that transmits a specific signal that enables the specification of the vehicle-mounted device to be obtained. The control device includes a receiving unit which is configured to be able to receive the specific signal, and a learning unit that learns that the specification of the vehicle-mounted device is a first specification if the receiving unit does not receive the specific signal, and learns that the specification of the vehicle-mounted device is a second specification, which is different from the first specification, when the receiving unit receives the specific signal.

10 Claims, 1 Drawing Sheet

CONTROL DEVICE

CROSS-REFERENCE TO RELATED APPLICATION

This application is based on and claims the benefit of priority from earlier Japanese Patent Application No. 2018-186935 filed on Oct. 1, 2018, the description of which is incorporated herein by reference.

TECHNICAL FIELD

The present disclosure relates to a control device that obtains a specification of a vehicle-mounted device which is mounted on a vehicle, and implements a control according to the specification.

BACKGROUND

For example, some idling stop control devices change the conditions under which idling stops are allowed and prohibited depending on whether the transmission is a manual transmission (MT) or automatic transmission (AT), or change the conditions under which idling stops are allowed and prohibited depending on whether the power steering is a hydraulic type or an electric type. Therefore, in such control devices, it is necessary to perform specification learning with respect to vehicle-mounted devices such as the transmission or the power steering.

SUMMARY

In a control device according to a first aspect, the control device obtains a specification of a vehicle-mounted device which is mounted on a vehicle, and implements a control according to the specification. The vehicle-mounted device includes a transmission unit that transmits a specific signal that enables the specification of the vehicle-mounted device to be obtained. The control device includes a receiving unit which is configured to be able to receive the specific signal, and a learning unit that learns that the specification of the vehicle-mounted device is a first specification if the receiving unit does not receive the specific signal, and learns that the specification of the vehicle-mounted device is a second specification, which is different from the first specification, when the receiving unit receives the specific signal.

DETAILED DESCRIPTION OF THE PREFERRED EMBODIMENTS

Figure 1:
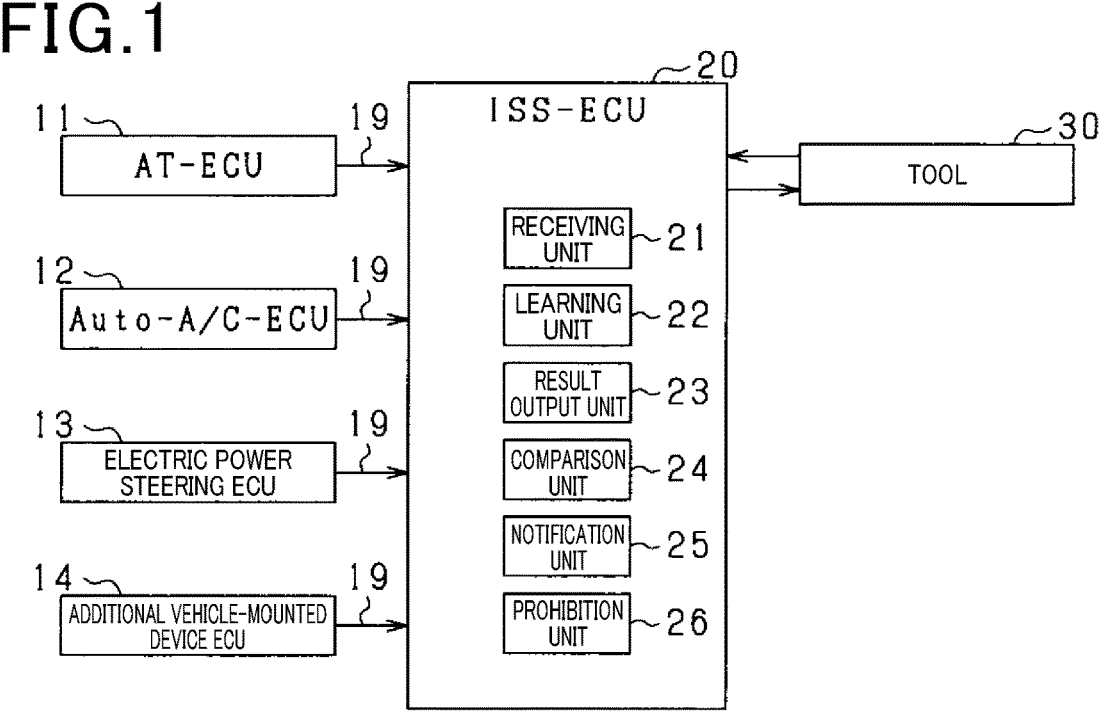
FIG. 1 is a schematic diagram showing a control device (ISS-ESU) according to a first embodiment.

JP 5136836 B2 is an example of a technique for performing specification learning with respect to a vehicle-mounted device. In the control device described in JP 5136836 B2, the specification information writing status that relates to a vehicle-mounted device is self-diagnosed when the engine is started, and an on-board specification writing mode is executed if the specification information is not present. Consequently, an operator is able to write the specification information of a vehicle-mounted device to a control device without using a dedicated tool, allowing an improvement in convenience and a reduction in manufacturing burden to be achieved.

However, in vehicles in which the vehicle-mounted devices have significant variation, the amount of specification information written by an operator via an on-board specification writing increases, which contributes to a deterioration in the takt (cycle) time. Furthermore, because specification learning with respect to the vehicle-mounted devices is performed solely by an on-board specification writing by an operator, it is possible that erroneous learning caused by human error may occur when the learning takes place.

The present disclosure has been made in view of the above circumstances, and has an object of inhibiting a deterioration in the time takt (cycle) by quickly performing specification learning with respect to a vehicle-mounted device using a control device, and inhibiting erroneous learning.

In a control device according to a first aspect, the control device obtains a specification of a vehicle-mounted device which is mounted on a vehicle, and implements a control according to the specification. The vehicle-mounted device includes a transmission unit that transmits a specific signal that enables the specification of the vehicle-mounted device to be obtained. The control device includes a receiving unit which is configured to be able to receive the specific signal, and a learning unit that learns that the specification of the vehicle-mounted device is a first specification if the receiving unit does not receive the specific signal, and learns that the specification of the vehicle-mounted device is a second specification, which is different from the first specification, when the receiving unit receives the specific signal.

According to the present disclosure, since the learning unit automatically learns the specification of a vehicle-mounted device depending on whether or not a specific signal is received from the receiving unit, the learning can be performed quickly. Therefore, it is possible to inhibit a deterioration in the takt (cycle) time of the specification learning with respect to a vehicle-mounted device. Furthermore, since the learning unit automatically learns the specification of a vehicle-mounted device in this manner, it is possible to inhibit erroneous learning caused by human error compared to a case where an operator performs the specification learning with respect to a vehicle-mounted device by manually writing the specifications or the like.

An embodiment of the present disclosure will be described with reference to the drawings. However, the present disclosure is not limited to the embodiment, and can be implemented with appropriate modifications without departing from the scope of the disclosure.

First Embodiment

FIG. 1 is a schematic diagram showing an ISS-ECU 20 (Idling Stop System-Electronic Control Unit) (idling stop control device), which is a control device according to the present embodiment. A vehicle to which the ISS-ECU 20 is mounted includes vehicle-mounted devices such as a transmission, an air conditioner, power steering, and the like. The ISS-ECU 20 changes conditions under which idling stops are allowed and prohibited according to the specification of such vehicle-mounted devices.

If the vehicle includes an automatic transmission (hereinafter abbreviated to as an AT), an AT-ECU 11 that controls the AT is provided. In this case, the AT-ECU 11 is communicably connected to the ISS-ECU 20 by a CAN communication line 19. On the other hand, if the vehicle includes a manual transmission (hereinafter abbreviated to as an MT), the AT-ECU 11 is not provided.

If the vehicle includes an air conditioner with automatic output adjustment (hereinafter referred to as an Auto-A/C), an Auto-A/C-ECU 12 that controls the Auto-A/C is provided. In this case, the Auto-A/C-ECU 12 is communicably connected to the ISS-ECU 20 by a CAN communication line 19. On the other hand, if the vehicle includes an air conditioner with manual output adjustment (hereinafter referred to as a Manual-A/C), the Auto-A/C-ECU 12 is not provided. The Auto-A/C referred to here, for example, is an air conditioner that automatically controls the output flow intensity and the like such that, when a desired temperature is inputted, the temperature is maintained at the desired temperature. On the other hand, the Manual-A/C is an air conditioner in which the output flow intensity itself is manually adjusted.

If the vehicle includes electric power steering, electric power steering ECU 13 that controls the electric power steering is provided. In this case, the electric power steering ECU 13 is communicably connected to the ISS-ECU 20 by a CAN communication line 19. On the other hand, if the vehicle includes hydraulic power steering, the electric power steering ECU 13 is not provided.

Furthermore, if the vehicle includes an additional vehicle-mounted device controlled by a predetermined ECU 14, the ECU 14 (additional vehicle-mounted device ECU 14) is provided. In this case, the additional vehicle-mounted device ECU 14 is communicably connected to the ISS-ECU 20 by a CAN communication line 19.

FIG. 1 shows a case where the AT-ECU 11, the Auto-A/C-ECU 12, the electric power steering ECU 13, and the additional vehicle-mounted device ECU 14 are all provided.

The IS S-ECU 20 includes a receiving unit 21, a learning unit 22, a result output unit 23, a comparison unit 24, a notification unit 25, and a prohibition unit 26.

The receiving unit 21 is configured so as to be able to receive, from the ECUs 11 to 14 of each of the vehicle-mounted devices, a specific signal (an ID or the like) that enables the presence of the ECUs 11 to 14 to be confirmed. If the receiving unit 21 does not receive a specific signal, the learning unit 22 learns that the vehicle-mounted devices does not include the ECUs 11 to 14, that is, the vehicle-mounted device has a specification in which it is not controlled by the ECUs 11 to 14 (first specification). On the other hand, if the receiving unit 21 receives the specific signal, it is learned that the vehicle-mounted device includes the ECUs 11 to 14, that is, the vehicle-mounted device has a specification (second specification) in which it is controlled by the ECUs 11 to 14.

Specifically, in a transmission specification learning, the learning unit 22 learns that the transmission is a manual transmission (MT) if the receiving unit 21 does not receive a specific signal from the AT-ECU 11. Further, the learning unit 22 learns that the transmission is an automatic transmission (AT) if the receiving unit 21 receives a specific signal from the AT-ECU 11.

Moreover, in an air conditioner specification learning, the learning unit 22 learns that the air conditioner is a Manual-A/C if the receiving unit 21 does not receive a specific signal from the Auto-A/C-ECU 12. Further, the learning unit 22 learns that the air conditioner is an Auto-A/C if the receiving unit 21 receives a specific signal from the Auto-A/C-ECU 12.

Furthermore, in a power steering specification learning, the learning unit 22 learns that the power steering is hydraulic power steering if the receiving unit 21 does not receive a specific signal from electric power steering ECU 13. Further, the learning unit 22 learns that the power steering is electric power steering if the receiving unit 21 receives a specific signal from the electric power steering ECU 13.

Figure 2:
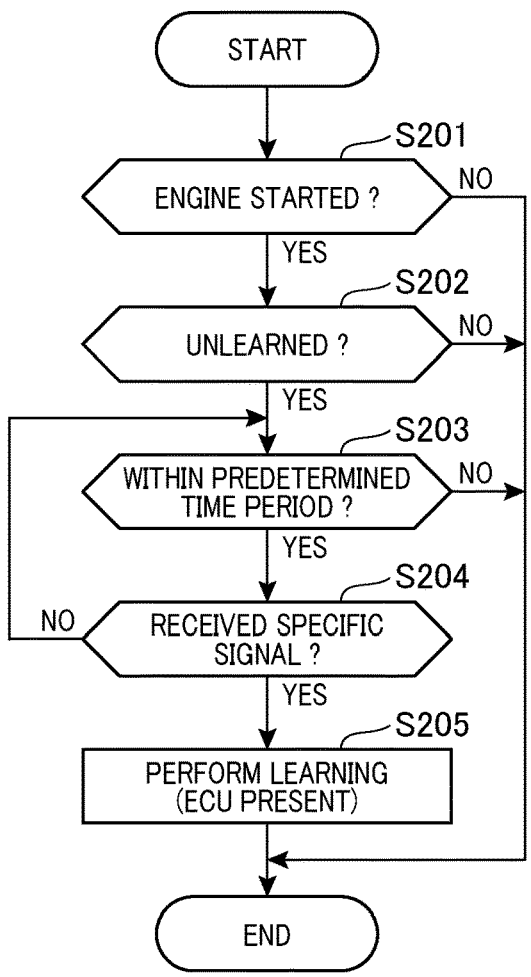
FIG. 2 is a flowchart showing specification learning with respect to a vehicle-mounted device performed by a learning unit.

FIG. 2 is a flow chart showing the specification learning performed by the learning unit 22 with respect to a vehicle-mounted device. This specification learning for a vehicle-mounted device is performed for every vehicle-mounted device.

First, the transmission specification learning will be described. In the initial state (unlearned state), the learning unit 22 assumes that the transmission is an MT.

In the transmission specification learning, it is first determined whether or not the engine has been started (S201). If it is determined that the engine has not been started (S201: NO), the specification learning ends. On the other hand, if it is determined that the engine has been started (S201: YES), it is determined whether or not the specification of the transmission is unlearned (S202). If it is determined that specification has already been learned (S202: NO), the specification learning ends. On the other hand, if it is determined that the specification is unlearned (S202: YES), it is determined whether or not a predetermined time period (for example, two seconds) is yet to elapse since starting the engine (S203).

If it is determined in S203 that the predetermined time period is yet to elapse (S203: YES), reception confirmation is performed by attempting reception of a specific signal from the AT-ECU 11 (S204). If a specific signal is not received two or more times (S204: NO), the process returns to S203. Then, reception confirmation (S204) is performed by attempting reception until the predetermined time period elapses (S203: NO). On the other hand, if the specific signal is received two or more times (S204: YES), it is learned that the AT-ECU 11 is present, that is, it is learned that the transmission is an AT (S205). Then, the specification learning ends.

On the other hand, if it is determined in S203 that the predetermined time period has elapsed without receiving the signal two or more times (S203: NO), the specification learning ends in the initial state. As a result, it is learned that the transmission has a specification corresponding to the initial state (MT).

As described above, the ISS-ECU 20 assumes that the transmission is an MT in the initial state (unlearned state), and learns that the transmission is an AT if a specific signal is received from the AT-ECU 11. Therefore, unless a specific signal is received from the AT-ECU 11, it is assumed that the transmission is an MT. In S202, it is determined whether or not the specification is unlearned. Therefore, a specification that has already been learned is not relearned, even when the engine is started. In a case where learning indicating that the transmission is an AT has taken place, the learning can only be returned to the initial state (MT) by means of a reset request from a tool 30 available in a repair shop or the like.

Next, the differences in the idling stop control for the different types of transmissions will be described. If the ISS-ECU 20 determines that the transmission is an MT, the idling stop control is performed as follows. That is, an idling stop is performed on a condition that the vehicle speed is zero, the gear is in neutral, and the clutch pedal is not depressed. The engine is restarted on s condition that the clutch pedal is depressed from this state.

On the other hand, if the IS S-ECU 20 has learned that the transmission is an AT, the idling stop control is performed as follows. That is, an idling stop is performed on a condition that the vehicle speed is zero and the brake pedal is depressed. Furthermore, the engine is restarted on a condition that the brake pedal is released from this state.

Next, the air conditioner specification learning will be described. In the initial state, the learning unit 22 assumes that the air conditioner is a Manual-A/C.

Only the aspects of the air conditioner specification learning that are different from the transmission specification learning will be described. In S204, if it is determined that a specific signal has been received two or more times from the Auto-A/C-ECU 12 (S204: YES), it is learned that the Auto-A/C-ECU 12 is present, that is, it is learned that the air conditioner is an Auto-A/C (S205). Then, the specification learning ends.

On the other hand, if it is determined in S203 that the predetermined time period has elapsed without receiving a specific signal two or more times (S203: NO), the specification learning ends in the initial state. As a result, it is learned that the air conditioner has a specification corresponding to the initial state (Manual-A/C).

As described above, the learning unit 22 assumes that the air conditioner is a Manual-A/C in the initial state, and learns that the air conditioner is an Auto-A/C if a specific signal is received from the Auto-A/C-ECU 12. Therefore, the learning unit 22 assumes that the air conditioner is a Manual-A/C unless a signal is received from the Auto-A/C-ECU 12. In a case where learning indicating that the air conditioner is an Auto A/C has taken place, the learning can only be returned to the initial state specification (Manual-A/C) by means of a reset request from a tool 30 available in a repair shop or the like.

Next, the differences in the idling stop control for the different types of air conditioners will be described. If the IS S-ECU 20 determines that the air conditioner is a Manual-A/C, an idling stop is prohibited in each of the following cases. That is, an idling stop is prohibited when an idling stop prohibition signal is received by a direct line signal inputted from the air conditioner. For example, this includes a case where the output intensity of the air conditioner is set at or above a predetermined amount. Furthermore, an idling stop is prohibited when the outside temperature is at or above a predetermined temperature. This is because a considerable amount of power is expected to be consumed for cooling. Moreover, an idling stop is also prohibited when the outside temperature is at or below a predetermined temperature. This is because a considerable amount of power is expected to be consumed for heating. In addition, an idling stop is prohibited if the continuous operation time period of the engine is less than a predetermined time period. This is because there can often be a power shortage immediately after starting the engine. Further, an idling stop is allowed at the point the predetermined time period has elapsed since starting the engine.

Further, in a state where an idling stop is allowed and the current state is in an idling stop, the engine is restarted if any of the following are established. That is, the engine is restarted when an idling stop prohibition signal is received by a direct line signal inputted from the air conditioner during an idling stop. Furthermore, the engine is restarted when the outside temperature is at or above a predetermined temperature. Moreover, the engine is also restarted when the outside temperature is at or below a predetermined temperature. The engine is also restarted when the continuous idling stop time period becomes longer than a predetermined time period during the idling stop. This is because there can often be a power shortage when the continuous idling stop time period becomes longer than the predetermined time period.

On the other hand, if the IS S-ECU 20 has learned that the air conditioner is an Auto-A/C, the idling stop control is performed as follows. That is, the ISS-ECU 20 determines whether an idling stop is allowed or prohibited depending on the existence of an idling stop prohibition signal received via a CAN communication from the Auto-A/C-ECU 12.

Furthermore, in a state where an idling stop is allowed and the current state is in an idling stop, the ISS-ECU 20 restarts the engine if an idling stop prohibition signal is received from the Auto-A/C-ECU 12 through the CAN communication line 19.

Next, the power steering specification learning will be described. In an initial state (unlearned state), the learning unit 22 assumes that the power steering is hydraulic power steering.

Only the aspects of the power steering specification learning that are different from the transmission specification learning will be described. In S204, if it is determined that a specific signal has been received two or more times from the electric power steering ECU 13 (S204: YES), it is learned that the electric power steering ECU 13 is present, that is, it is learned that the power steering is electric power steering (S205). Then, the specification learning ends.

On the other hand, if it is determined in S203 that the predetermined time period has elapsed without receiving a specific signal two times (S203: NO), the specification learning ends in the initial state. As a result, it is learned that the power steering has a specification corresponding to the initial state (hydraulic power steering).

As described above, the learning unit 22 assumes that the power steering is hydraulic power steering in the initial state, and learns that the power steering is electric power steering if a specific signal is received from the electric power steering ECU 13. Therefore, it is assumed that the power steering is hydraulic power steering unless a signal is received from the electric power steering ECU 13. In a case where the learning unit 22 has learned that the power steering is electric power steering, the learning can only be returned to the initial state specification (hydraulic power steering) by means of a reset request from a tool 30 available in a repair shop or the like.

Next, the difference in the idling stop control for the different types of power steering will be described. The ISS-ECU 20 performs the following control if the power steering is hydraulic power steering. That is, an idling stop is allowed if the steering angle of the steering wheel is within a predetermined range from a straight-ahead state, and an idling stop is prohibited if the angle is outside of the predetermined range. Furthermore, in a state where an idling stop is allowed and the current state is in an idling stop, the ISS-ECU 20 restarts the engine if the steering angle of the steering wheel is rotated by more than a predetermined angle from the steering angle at the point the idling stop was started.

On the other hand, the IS S-ECU 20 performs the following control if the power steering is electric power steering. That is, similarly to the case of hydraulic power steering, an idling stop is allowed if the steering angle of the steering wheel is within a predetermined range from a straight-ahead state, and an idling stop is prohibited if the angle is outside of the predetermined range. Furthermore, in a state where an idling stop is allowed and the current state is in an idling stop, the ISS-ECU 20 restarts the engine if the steering angle of the steering wheel is rotated by more than a predetermined angle from the steering angle at the point the idling stop was started. However, the predetermined angle here is smaller than the predetermined angle in the case of hydraulic power steering. This is because hydraulic power steering does not cause a steering lock when the engine is stopped, but electric power steering causes a steering lock when the engine is stopped.

Next, a vehicle-mounted device specification relearning function will be described. If a learning reset request is received from a tool 30, the learned information is reset, and the elapsed time period since starting the engine is also cleared. The flow of the specification learning is the same as that described above. Therefore, when a learning reset request is received while the engine is activated, the elapsed time period since starting the engine is set to zero. As a result, in S201, it is determined that the engine has been started (S201: YES), and the specification learning starts immediately. Then, an unlearned state is determined in S202 (S202: YES), and a time period within the predetermined time period is determined in S203 (S203: YES). Then, it is determined whether or not a specific signal has been received in S204. The learning unit 22 is configured to be able to relearn a specification after learning the specification of a vehicle-mounted device. The learning frequency is counted.

The description will be continued returning to FIG. 1. The result output unit 23 is configured to be able to output the learning result from the learning unit 22 to the outside. As a result, an operator is able to read the learning result from the result output unit 23 using a tool 30 and the like available in a repair shop. Consequently, an operator is able to confirm information such as whether the transmission is an MT or an AT, the air conditioner is a Manual-A/C or an Auto-A/C, and the power steering is electric power steering or hydraulic power steering.

When the learning unit 22 performs relearning, the comparison unit 24 compares a previous learning result with the relearning result. Further, the previous learning result is tied to a VIN (Vehicle Identification Number). If the two results compared by the comparison unit 24 are different despite the VIN being the same (which equates to the vehicle being the same), the prohibition unit 26 prohibits idling stops, and the notification unit 25 issues an abnormality notification (which equates to a relearning request) to the learning unit 22. When the learning unit 22 receives the abnormality notification after the relearning, it repeats the relearning. Then, after performing the relearning several times, if an equivalent result is obtained in which the relearning result and the previous result are different, the learning unit 22 assumes that the vehicle-mounted device has the specification indicated by the relearning result.

According to the present embodiment, the following effects can be obtained. If the receiving unit 21 does not receive a specific signal from a predetermined ECU 11 to 14, the learning unit 22 is able to determine that the vehicle-mounted device does not include the ECU 11 to 14, that is, the vehicle-mounted device has a specification in which it is not controlled by the ECU 11 to 14 (first specification). On the other hand, if the receiving unit 21 receives a specific signal from predetermined ECU 11 to 14, the learning unit 22 is able to determine that the vehicle-mounted device includes the ECU 11 to 14, that is, the vehicle-mounted device has a specification in which it is controlled by the ECU 11 to 14 (second specification). Further, as described above, as a result of the learning unit 22 automatically learning the specification of a vehicle-mounted device depending on whether or not a specific signal is received, the learning can be performed quickly. Therefore, it is possible to inhibit a deterioration in the takt (cycle) time of the specification learning with respect to a vehicle-mounted device. Furthermore, because the learning unit 22 automatically learns the specification of a vehicle-mounted device in this manner, it is possible to inhibit erroneous learning caused by human error compared to a case where an operator performs the specification learning with respect to the vehicle-mounted device by manually writing the specification or the like.

An operator is able to read the learning result from the result output unit 23 and confirm that erroneous learning has not occurred using a tool 30 or the like. Therefore, erroneous learning can be more strongly avoided. Furthermore, if the comparison unit 24 compares the previous learning result and the relearning result, and determines that the two results are different, the notification unit 25 issues an abnormality notification to the learning unit 22, and the learning unit 22 repeats the relearning. Therefore, erroneous learning can be more strongly avoided. Furthermore, when the two results are different, it is possible to grasp an unintended replacement history in the vehicle factory or in the market by reading the previous learning result from the result output unit 23 using a tool 30 or the like. Furthermore, when the previous learning result and the relearning result are different, the prohibition unit 26 prohibits idling stops. Therefore, it is possible to avoid a situation in which an idling stop is performed while erroneous learning exists.

Other Embodiments

The present embodiment may also be implemented with the following modifications. For example, the ISS-ECU 20 may be replaced by other type of control devices. Examples of such control devices include an ECU for a battery monitoring system, an ECU for an automatic cruise system, and an ECU for an automatic braking system. Furthermore, for example, if the IS S-ECU 20 does not receive an expected specific signal from a predetermined ECU 11 to 14, instead of determining that the vehicle-mounted device is manually operated, it may be determined that the vehicle-mounted device is controlled by an ECU which is different from the predetermined ECUs 11 to 14.

Moreover, for example, in addition to determining the existence of expected predetermined ECUs 11 to 14 based on whether or not a specific signal has been received, the ISS-ECU 20 may specify the specification of a vehicle-mounted device in more detail by also specifying the specification of the ECUs 11 to 14 from the specific signal. Further, for example, the ISS-ECU 20 may also receive a specific signal, from which the specification of a vehicle-mounted devices can be specified, from a transmission unit which is different from the predetermined ECUs 11 to 14.

Furthermore, for example, if the relearning result and the previous learning result are different results even after performing the relearning several times, the result output unit 23 may output an abnormality notification to a tool 30 or the like without the learning unit 22 performing relearning. Further, for example, in S201, the determination of whether or not the engine has been started may be made based on whether or not an ignition switch has been turned on.

What is claimed is:

1. A control device for a vehicle, the control device comprising:
   a receiving unit that is configured to receive a signal from
      a vehicle-mounted device which is mounted on the vehicle, the signal including an indication of a specification of the vehicle-mounted device, and a learning unit that is configured to determine that (1) the specification of the vehicle-mounted device is a first specification type if the receiving unit does not receive the signal and (2) the specification of the vehicle-mounted device is a second specification type, which is different from the first specification type, when the receiving unit receives the signal.

2. The control device according to claim 1, wherein
the control device is an idling stop control device that is configured to determine if the conditions under which an idling stop is allowed and prohibited should change depending on the specification type of the vehicle-mounted device as determined by the learning unit.

3. The control device according to claim 1, wherein
the vehicle-mounted device includes a predetermined ECU, and
the learning unit is configured to learn that the specification of the vehicle-mounted device (1) is the first specification type which is not controlled by the ECU if the receiving unit does not receive the signal and (2) is the second specification type which is controlled by the ECU if the receiving unit receives the signal.

4. The control device according to claim 3, wherein
the vehicle-mounted device is a transmission, and
the learning unit is configured to learn that (1) the specification type of the transmission is a manual transmission if the receiving unit does not receive the and (2) the specification type of the transmission is an automatic transmission if the receiving unit receives the signal.

5. The control device according to claim 3, wherein
the vehicle-mounted device is an air conditioner, and
the learning unit is configured to learn that (1) the specification type of the air conditioner is a manual output adjustment type if the receiving unit does not receive the signal and (2) the specification type of the air conditioner is an automatic output adjustment type if the receiving unit receives the signal.

6. The control device according to claim 3, wherein
the vehicle-mounted device is a power steering unit, and
the learning unit is configured to learn that (1) the specification type of the power steering unit is hydraulic power steering if the receiving unit does not receive the signal and (2) the specification type of the power steering unit is electric power steering if the receiving unit receives the signal.

7. The control device according to claim 1, further comprising
a result output unit which is configured to output a learning result from the learning unit to outside of the control device.

8. The control device according to claim 1, wherein
the learning unit is configured to relearn the specification type after learning the specification type of the vehicle-mounted device and (2) repeat the relearning when a relearning result and a previous learning result are different from each other.

9. The control device according to claim 1, wherein
the control device is an idling stop control device,
the learning unit is configured to relearn the specification type after learning the specification type of the vehicle-mounted device, and
the idling stop control device includes a prohibition unit which prohibits idling stops when a relearning result and a previous learning result are different from each other.

10. The control device according to claim 1, wherein
the specification is a permanent physical characteristic of the vehicle-mounted device.

* * * * *